United States Patent
Colbourne (10) Patent No.: US 7,162,118 B1
(45) Date of Patent: Jan. 9, 2007

(54) DUAL OPTICAL SWITCH

(75) Inventor: Paul Colbourne, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 11/256,987

(22) Filed: Oct. 25, 2005

(51) Int. Cl.
- *G02B 6/42* (2006.01)
- *G02B 6/26* (2006.01)
- *G02B 6/28* (2006.01)
- *G02B 6/32* (2006.01)
- *H04J 14/02* (2006.01)

(52) U.S. Cl. .................. 385/19; 385/15; 385/16; 385/17; 385/18; 385/24; 385/25; 385/33; 385/34; 398/79; 398/81; 398/83

(58) Field of Classification Search ............ 385/15–19, 385/24, 34, 25, 33; 398/79, 81, 83
See application file for complete search history.

(56) References Cited

U.S. PATENT DOCUMENTS

| | | | |
|---|---|---|---|
| 4,172,630 A * | 10/1979 | Burns et al. | 385/16 |
| 6,353,692 B1 * | 3/2002 | Colbourne | 385/16 |
| 6,813,241 B1 | 11/2004 | Wang et al. | |
| 6,920,277 B1 | 7/2005 | Young et al. | |
| 2005/0036202 A1 * | 2/2005 | Cohen et al. | 359/495 |

* cited by examiner

*Primary Examiner*—Brian Healy
*Assistant Examiner*—Jerry Martin Blevins
(74) *Attorney, Agent, or Firm*—Teitelbaum & MacLean; Neil Teitelbaum; Doug MacLean (57) ABSTRACT

A single-sided optical switching device for functioning as a dual switch wherein individual switches share common switching means is disclosed. The individual switches have separate ports and share common switching means formed by a moveable refractor, a single lens and a stationary reflector, wherein the movable refractor is positionable between the lens and the stationary reflector for redirecting light within ports of individual switches. An embodiment of the device provides a single-sided dual 2×2 bypass switch comprising a single lens and a single switching element.

18 Claims, 5 Drawing Sheets

DUAL OPTICAL SWITCH

FIELD OF THE INVENTION

This invention relates to switching of light between optical components, and more specifically to an optical dual switching device for providing such switching.

BACKGROUND

Optical switches of various kinds for selectably switching incoming light from one optical fiber or light-conducting path to another are well known and used in many applications. In some cases, ganged operation of optical switches is required, when two or more optical beams, e.g. received from two or more input fibers, have to be simultaneously switched.

Figure 1:
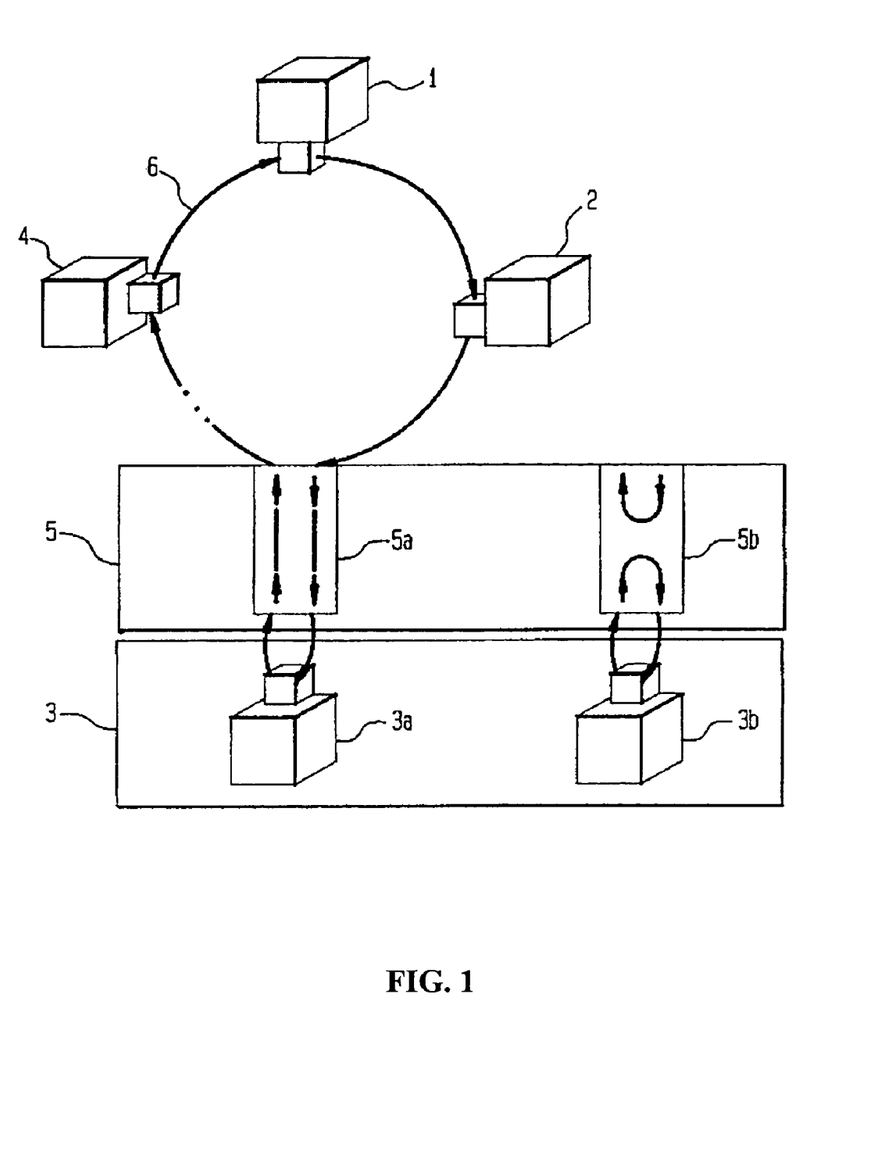
FIG. 1 is a schematic block diagram illustrating switching of a unidirectional optical traffic flow by an individual 2×2 bypass switch according to prior art.

An example of such application is bypass switching in optical networks, when bi-directional optical traffic has to be quickly redirected to bypass an optical ring or a node. Typically, this redirecting is accomplished using a 2×2 bypass switch in each direction of optical traffic flow, as illustrated in FIG. 1, showing both normal and bypassed optical traffic flow. A ring network 6 shown comprises nodes 1, 2, 3 and 4, connected in a serial fashion. A 2×2 bypass switch 5 serves as an interface between the ring and node 3; it can route optical information in either of two ways. This is illustrated in FIG. 1 by showing one state of the 2×2 switch as block 5a and the other as block 5b with blocks 5a and 5b connected to node blocks 3a and 3b, respectively. It should be understood that a single node 3 and single bypass switch 5 are in fact employed. The normal optical traffic flow to and from the node 3 through the ring 6 corresponds to a cross-state of the bypass switch illustrated by the block 5a. If a node fails or is disconnected, the ring will fail unless continuity of the ring is maintained. The block 5b illustrates a second state of the bypass switch 5 in which the ring continuity is maintained. Upon failure or disconnection of node 3, the node is bypassed by optical loopback, which can be referred to as a bypass or a loopback state.

A compact and efficient 2×2 optical bypass switch is disclosed by the inventor of the present invention in U.S. Pat. No. 6,353,692, assigned to JDS Uniphase, the assignee of the instant application, which is incorporated herein by reference. Advantageously, the switch employs only one lens and is single-sided, i.e. has all the input and output optical fibers at one side thereof, which enables compact packaging.

To address the requirement for optical bypass switching in bidirectional links, two conventional 2×2 optical bypass switches, synchronized and possibly bundled together, are commonly used. For example, Young et al. in U.S. Pat. No. 6,920,277 issued Jul. 19, 2005 disclose an architecture and method of creating optical bypass of a terminal node using two bypass switches. In another example, Wang et al. in U.S. Pat. No. 6,813,241 issued Nov. 2, 2004 disclosed a network architecture for link protection in a bidirectional data traffic network with a dual switch configuration consisting of two 1×2 optical switches.

The aforementioned prior-art solution, wherein two individual optical switches are combined together, provides a dual optical switch, which, although performing its intended function, is roughly twice as bulky and costly as a single switch.

The object of this invention is to provide a compact single-sided optical multi-switch device, wherein individual switches of said device share at least some of the optical components for reducing the size and complexity of the device.

Another object of this invention is to provide a simple and compact dual 2×2 optical bypass switch comprising a smaller number of optical components than two separate 2×2 optical bypass switches.

Another object of this invention is to provide a simple and compact dual optical switch comprising a single lens and a single switching element.

SUMMARY OF THE INVENTION

In accordance with the invention, an optical switching device is provided having the functionality of two or more optical switches. The optical switching device comprises:

a plurality of ports comprising: a first group of ports for transmitting and receiving a first optical signal and a second group of ports for transmitting and receiving a second optical signal; a stationary reflector for receiving the first optical signal from a first port of the first group of ports and the second optical signal from a first port of the second group of ports, and for substantially reflecting the first and second optical signals towards the plurality of ports; a lens disposed between the plurality of ports and the stationary reflector for substantially collimating the first and second optical signals at the stationary reflector, and for substantially focusing the first optical signal about the first group of ports, and the second optical signal about the second group of ports; and a movable refractor selectably positionable at two positions in and out of optical paths of the first and second optical signals between the plurality of ports and the stationary reflector, for directing the first optical signal to a second port of the first group of ports and the second optical signal to a second port of the second group of ports when the movable refractor is in a first of the two positions, and for redirecting the first optical signal to a third port of the first group of ports, and the second optical signal to a third port of the second group of ports by re-positioning the movable refractor into a second of the two positions; wherein the first group of ports and the second group of ports are mutually optically decoupled, so that to be substantially optically isolated when the movable refractor is in any one of the two positions, thereby providing dual switch functionality.

In accordance with one aspect of this invention, there is provided an optical switching device comprising: a first switch having at least three ports for receiving and transmitting a first optical signal, and a second switch having at least three ports for receiving and transmitting a second optical signal, wherein the ports of the second switch are disposed adjacent to the ports of the first switch, and wherein the first and the second switches share common switching means for synchronous switching the first and second switches between a first mode of operation and a second mode of operation. The common switching means comprises: a stationary reflector for receiving the first and second optical signals from the ports of the first and second switches respectively, and for substantially reflecting the first and second optical signals towards the ports of the first and second switches respectively, a lens disposed between the ports of the first and second switches at one side thereof, and the stationary reflector at another side thereof, for substantially collimating the first and second optical signals at the stationary reflector, and for substantially focusing the first and second optical signals about the ports of the first and second switches respectively, and a movable refractor positionable in and out of optical paths of the first and second optical signals between the stationary reflector and the ports of the first and second switches for providing the first and second modes of operation, wherein in the first mode of operation a first port of the first switch is optically coupled to a second port of the first switch, and a first port of the second switch is optically coupled to a second port of the second switch, and wherein in the second mode of operation the first port of the first switch is optically coupled to a third port of the first switch, and the first port of the second switch is optically coupled to a third port of the second switch.

In accordance with one embodiment of this invention, there is provided a dual bypass 2×2 switch functioning as two individual 2×2 bypass switches ganged together for synchronous switching.

In accordance with another embodiment of this invention, there is provided a dual 1×2 switch functioning as two individual 1×2 optical switches ganged together.

Advantageously, the instant invention provides a switching device, wherein synchronous switching within two or more substantially mutually optically isolated groups of ports is achieved by sharing common switching means for redirecting light within each group of ports. This sharing results in the device which is almost as simple as a single switch, but provides the functionality of two or more optically isolated switches, thereby enabling substantial size and cost reduction comparing to the prior art solutions.

Also advantageously, the optical switching device provided by the current invention is single-sided, so that all the fiber ports disposed at the same side thereof, making the switch more compact than conventional double-sided switches.

BRIEF DESCRIPTION OF THE DRAWINGS

Exemplary embodiments of the invention will now be described in conjunction with the drawings in which.

DETAILED DESCRIPTION

A preferred embodiment of an optical switching device according to the present invention is shown in FIGS. 2A–4C and will now be discussed. In this embodiment, the switching device can function as two ganged 2×2 bypass optical switches, which are simultaneously switchable between two modes of operation. Such a switching device capable of functioning as two ganged optical switches will also be referred to herein as a dual optical switch, or, with reference to the particular first embodiment described hereinafter, as a dual 2×2 bypass optical switch.

Figure 2A:
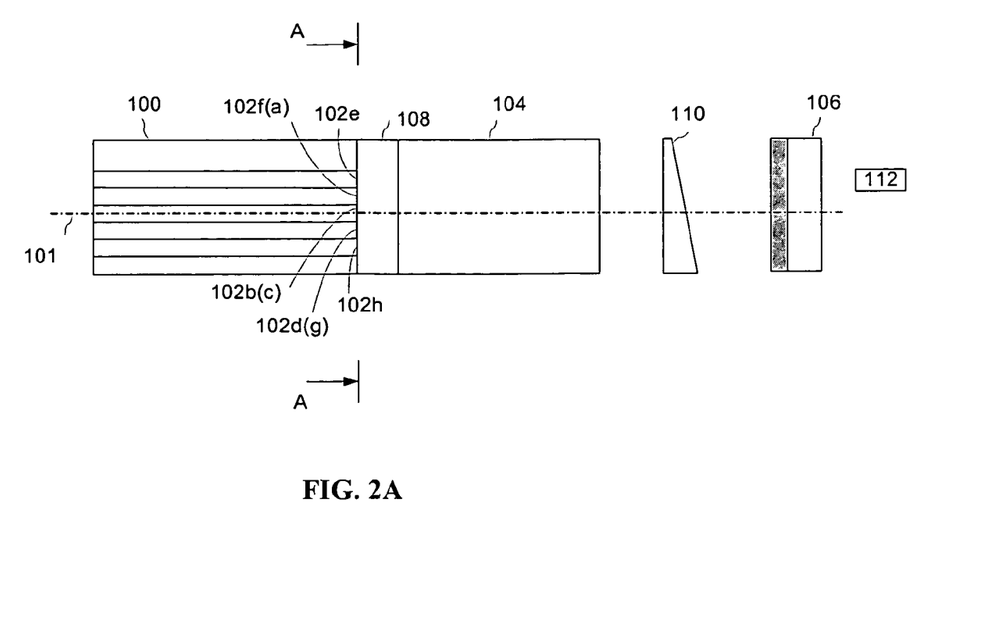
FIGS. 2A and 2B are diagrams showing a side-view and a vertical cross-section, respectively, of a dual 2×2 bypass switching device according to the present invention.

FIG. 2A schematically shows a side-view of the dual 2×2 bypass switching device according to the present invention. An optical fiber sleeve 100 houses a plurality of optical fiber ends. The end faces of the fibers form a plurality of optical ports generally referred to as 102. The ports 102 are optically coupled to a substantially collimating/focusing lens 104, preferably in the form of a graded index (GRIN) lens, disposed adjacent the ports 102. The lens 104 is for focusing light at the ports 102 and for collimating light at a distal end of the switch at a reflector 106, embodied as a stationary substantially reflective mirror. In the shown embodiment, the lens 104 and the ports 102 are disposed symmetrically about an optical axis 101, and the stationary reflector 106 has a reflecting surface disposed normally to the optical axis 101. The optical fiber ends providing the ports 102 can be either single mode or multi-mode.

A moveable refractor 110, in the form of a light-transmissive wedge having an index of refraction different from an adjacent surrounding medium, is positionable at two positions in or out of an optical path between the lens 104 and the reflector 106. Alternatively, the refractor 110 comprises a prism or a refractive optoelectronic device. An actuator 112 coupled to the refractor 110 is provided for selectably repositioning the refractor 110 such that switching of incoming beams of light between ports 102 is performed, as described in detail hereinafter in this specification. Optionally, a spacer 108 of light-transmissive material is placed in the optical path between the ports 102 and the lens 104 to reduce insertion losses resulting from an air space which exists between the lens 104 and the reflector 106.

Figure 2B:
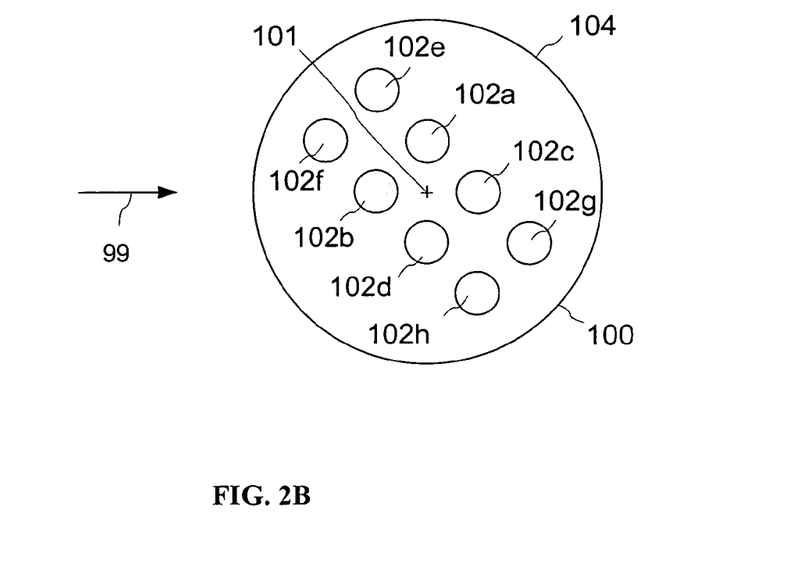

The optical switching device shown in FIG. 2A is based on the general design concept of the one-sided optical switch disclosed in U.S. Pat. No. 6,353,692, hereinafter referred to as '692, except for the number and positioning of the optical ports 102. An example of the positioning of the ports 102 within the optical sleeve 100 according to the present invention is illustrated in FIG. 2B, which represents a vertical cross-section AA of the device in a plane normal to the fiber ends. In the shown example, the positioning of the ports 102 within the optical sleeve 100 also defines the ports' 102 position relative to the GRIN lens 104.

According to the present invention, the ports 102 are disposed in a predetermined spatial arrangement relative to each other and to the lens 104, so to form two mutually optically decoupled groups of ports. In the context of this specification, two groups of ports of a switching device are considered to be mutually optically decoupled or, equivalently, substantially mutually optically isolated, if, in any one of the two modes of stationary operation of the device, an optical beam received by any one port from one of the two groups, after traversing through the device, is either directed to a port from the same group of ports, or is substantially lost, so to provide at least 20 dB, or, preferably, more than 40 dB of optical isolation between any two ports not from the same group.

In the exemplary embodiment shown in FIGS. 2A,B, these two optically-decoupled groups are: a first group of ports formed by four ports 102a, 102b, 102c, and 102d, associated with a first switch of the two ganged switches, and a second group of ports formed by four ports 102e, 102f, 102g, and 102h, associated with a second switch of the two ganged optical switches. For illustration purposes, in FIG. 2A and thereafter, ports of the first group and the corresponding fiber ends are shown dot-shaded. The first group of ports will also be referred to as the ports 102a–d, and the second group of ports will also be referred to as the ports 102e–h.

Referring to FIG. 2B, in the shown example the ports 102 are disposed in two rows, with four ports in each row, so that the ports of the first group are disposed between the ports of the second group. Within each row, the ports are aligned with each other. An arrow 99 shows a direction of view corresponding to FIG. 2A, so that in FIG. 2A the ports 102a, 102c and 102g are behind the ports 102f, 102b and 102d, respectively, as indicated by labels "102f(a)", "102b(c)" and "102d(g)", with literals in brackets corresponding to the ports which are hidden.

In the absence of the second group of ports 102e–h, the device shown in FIGS. 2A,B is substantially similar to the one-sided 4-port optical switch disclosed in '692, which has two modes of operation and functions as a 2×2 bypass optical switch. Advantageously, the addition of the second group of ports 102e–h to the first group of ports 102a–d disclosed in '692, is functionally equivalent to adding a second 2×2 bypass optical switch to form a dual-switch device without adding any other optical components, and therefore without adding substantially to the size or cost of the switch, as the first group of ports and the second group of ports share the same optical components for light redirection: lens 104, reflector 106, optional spacer 108, moveable refractor 110, and actuator 112, which together form common switching means of the device.

Functioning of the dual switch device shown in FIGS. 2A,B will now be addressed by way of describing stationary modes of operation of the device.

Turning again to FIG. 2B, for each of the two groups of ports shown, a beam of light received at one port of said group, is directed through optical components 104, 106, 108, and 110 to either another port of said group, or away from any of the ports 102a–102h, so that the beam is lost. This arrangement of the ports enables the device, without adding any other optical components but the optical ports, to provide a light redirection functionality of a dual 2×2 optical bypass switch, as will now be described.

In a first mode of operation, a beam of light from each of the ports 102a and 102b of the first group of ports, traversing the lens 104 for collimation at the reflector 106, is reflected to adjacent ports 102c and 102d, respectively, of the same first group of ports, after being focused by the same lens 104. Independently, a beam of light from each of the ports 102e and 102f of the second group of ports, traversing the lens 104 for collimation at the reflector 106, is reflected to ports 102h and 102g, respectively, of the second group of ports, after being focused by the same lens 104.

Figure 3A:
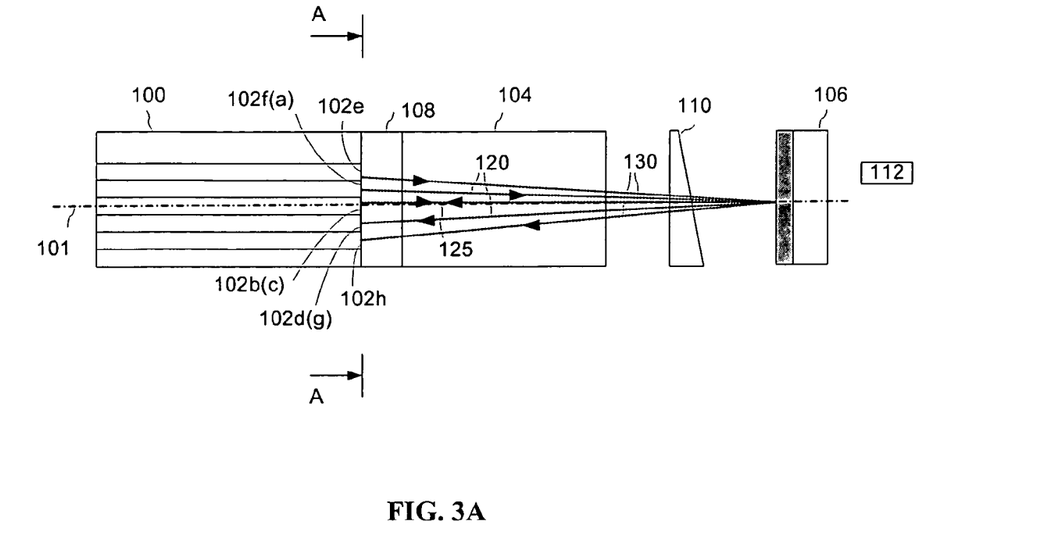
FIG. 3A is a schematic diagram representing beams of light within the switching device shown in FIGS. 2A and 2B in the first mode of operation.
Figure 3B:
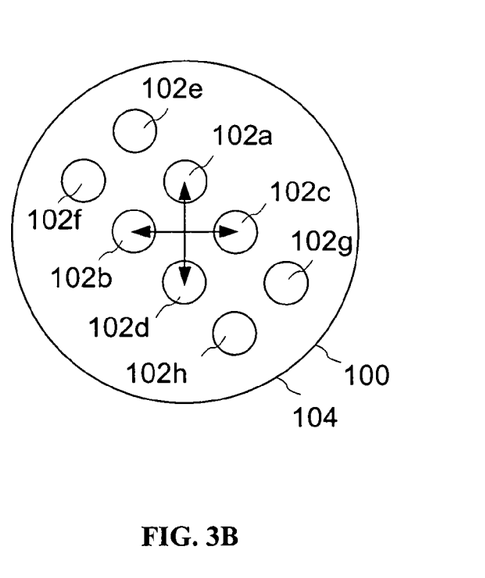
FIGS. 3B and 3C are diagrams illustrating optical coupling within a first group of ports and a second group of ports, respectively, in the first mode of operation of the switching device shown in FIGS. 2A and 2B.
Figure 3C:
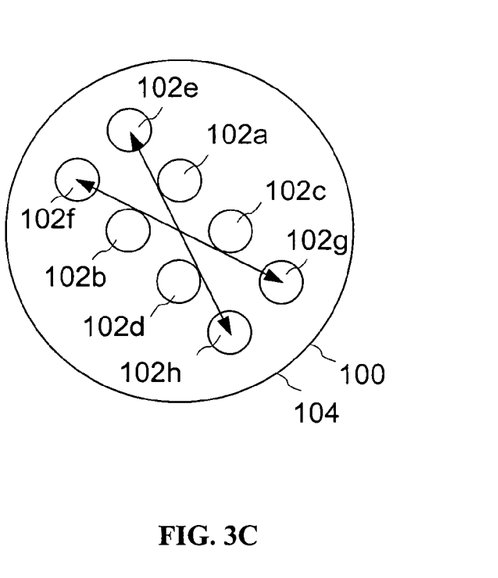

This mode of operation, with the moveable refractor 110 positioned at a first of the two positions, namely out of the optical path between the lens 104 and the reflector 106, is illustrated in FIGS. 3A, 3B, and 3C. FIG. 3A schematically represents beams of light within the switch, while FIGS. 3B and 3C illustrate optical coupling within the first group of ports and the second group of ports respectively. It should be understood, that FIGS. 3B and 3C are concurrent and show the switching device in the same mode of operation thereof.

An arrow 125 in FIG. 3A represents the beam of light received at the port 102b of the first group of ports, traversing the lens 104 for collimation at the reflector 106, and, after being focused by the lens 104, reflected to the hidden port 102c of the first group. As those skilled in the art would appreciate, this beam trace can be reversed, leading to the coupling of ports 102b, c as shown in FIG. 3B with a double-sided arrow. Similarly, directions of all other beams described hereinafter are reversible, so that each of two optically coupled ports described hereinafter can be either an input or an output port of the device.

Arrows 120 in FIG. 3A represent two beams of light: one received at the port 102f of the second group, and another received at the hidden port 102a of the first group; these two beams traverse the same lens 104 for collimation at the reflector 106 and, after reflecting therefrom, are focused by the lens 104, and directed to the port 102g, hidden, of the second group, and the port 102d of the first group, respectively, as shown in FIGS. 3B,C.

Finally, arrows 130 illustrate a beam entering the switching device via the port 102e of the second group, and directed by the lens 104 and the reflector 106 to the port 102h of the same second group.

The aforedescribed first mode of operation, as should be evident from FIGS. 3B,C, provides a dual bypass 2×2 switch functioning as two individual 2×2 bypass switches disclosed in '692, one with ports 102a–d, and the other with ports 102e–h, and sharing all the other optical components, wherein each of the two individual 2×2 bypass switches is in the cross-state.

Figure 4A:
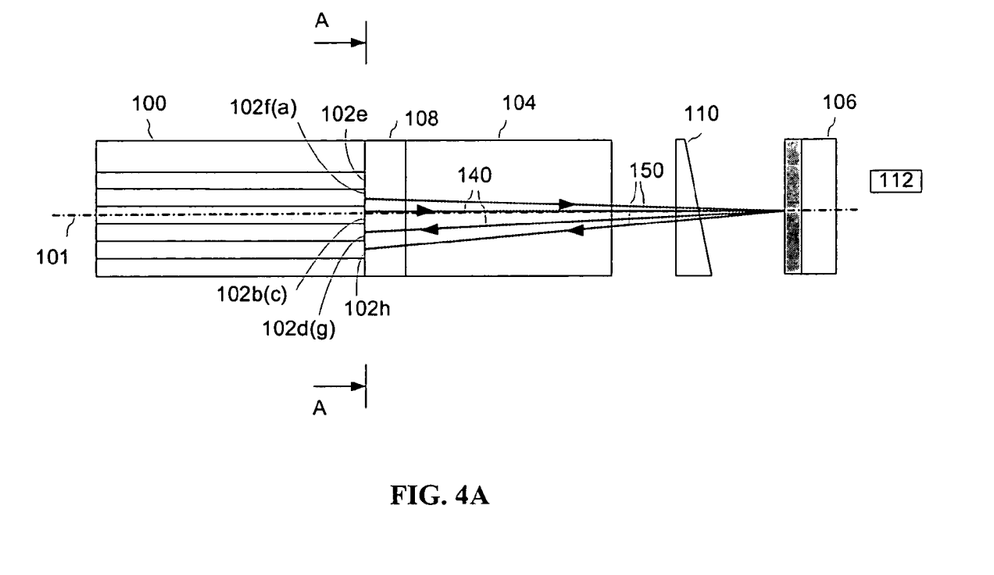
FIG. 4A is a schematic diagram representing beams of light within the switching device of the present invention in the second mode of operation.
Figure 4B:
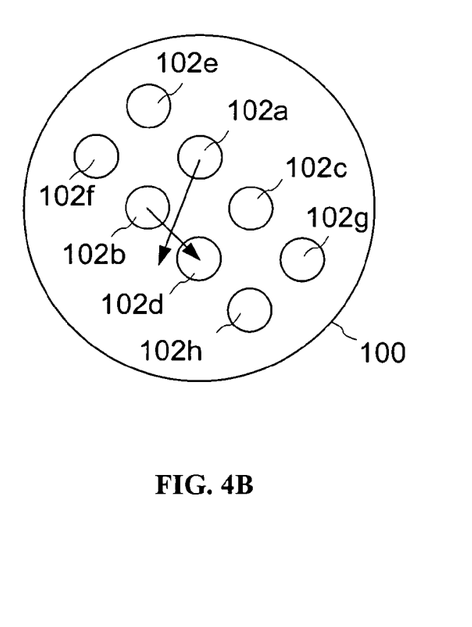
FIGS. 4B and 4C are diagrams illustrating optical coupling within the first group of ports and the second group of ports, respectively, in the second mode of operation of the switching device of the present invention.
Figure 4C:
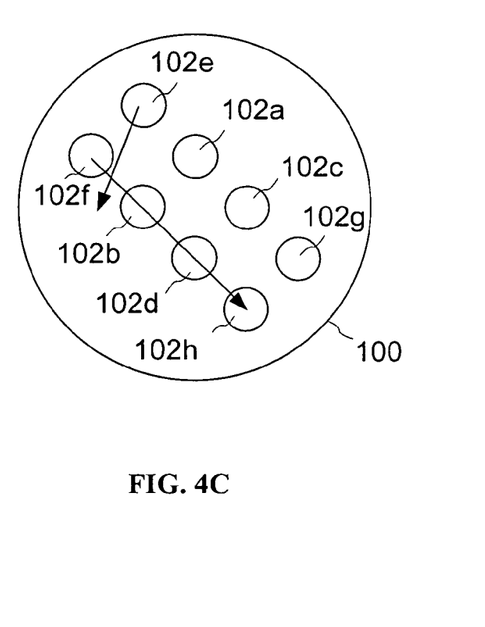

A second mode of operation, with the moveable refractor 110 positioned at a second of the two positions, namely in the optical path between the lens 104 and the reflector 106, is illustrated by FIGS. 4A, 4B, and 4C. FIG. 4A schematically shows beams of light, represented by arrows representing rays, within the switch, while FIGS. 4B and 4C illustrate optical coupling within the first group of ports and the second group of ports respectively. It should be understood, that FIGS. 4B and 4C are concurrent and show the same mode of operation of the switch. The beams of light entering the switching device of the present invention via its ports, e.g. as shown in FIGS. 3A–4C, will also be referred hereinafter in this specification as optical signals.

In this second mode of operation, the two beams of light from the ports 102a and 102b of the first group of ports traverse the lens 104 and the refractor 110 for collimation and reflection at the reflector 106. As the beams traverse the air-refractor interface, their directions change according to Snell's Law. The beams return by passing through the same refractor 110 and the lens 104, and are directed in such a way that the beam transmitted from port 102b is focused at port 102d, as shown by arrows 140 in FIG. 4A, while the beam transmitted from port 102a is not directed to any port of the first or second group of ports, as illustrated in FIG. 4C, and is thereby lost. Similarly, in this second mode of operation, the two beams of light from the ports 102f and 102e of the second group of ports traverse through the same lens 104 and the same refractor 110 for collimation and reflection at the reflector 106, experience direction changes according to Snell's Law passing the refractor 110, and return by passing through the same refractor 110 and the lens 104, and are directed in such a way that the beam transmitted from port 102f, which is represented by arrows 150 in FIG. 4A, is focused at port 102h, while the beam transmitted from port 102e is not directed to any port of the first or second group of ports, as illustrated in FIG. 4C, and is thereby lost. The ports 102a and 102c of the first group of ports, and the ports 102e, 102g of the second group of ports, are not coupled to any other port of the switch, while in the second mode of operation.

The aforedescribed second mode of operation, as should be evident from FIGS. 4B,C, provides a dual bypass 2×2 switch with each of the individual switches in the bypass state.

Similarly as described in '692, switching between the first and second mode of operation is effected by activating the actuator 112, which then moves the refractor 110 into or out of the optical path. Advantageously, in the switching device of the present invention, this re-positioning of the refractor 110 provides synchronous switching of the light beams within the first and second group of ports.

Effectively, the switching device shown in FIGS. 2A–4C provides two individual 2×2 switches ganged together for synchronous operation, wherein the first group of ports form ports of a first individual switch, the second group of ports form ports of a second individual switch, and the two individual switches of the switching device share the common switching means formed by the lens 104, the reflector 106, the refractor 110, and the actuator 112, for synchronous switching the first and second switches.

Figure 5:
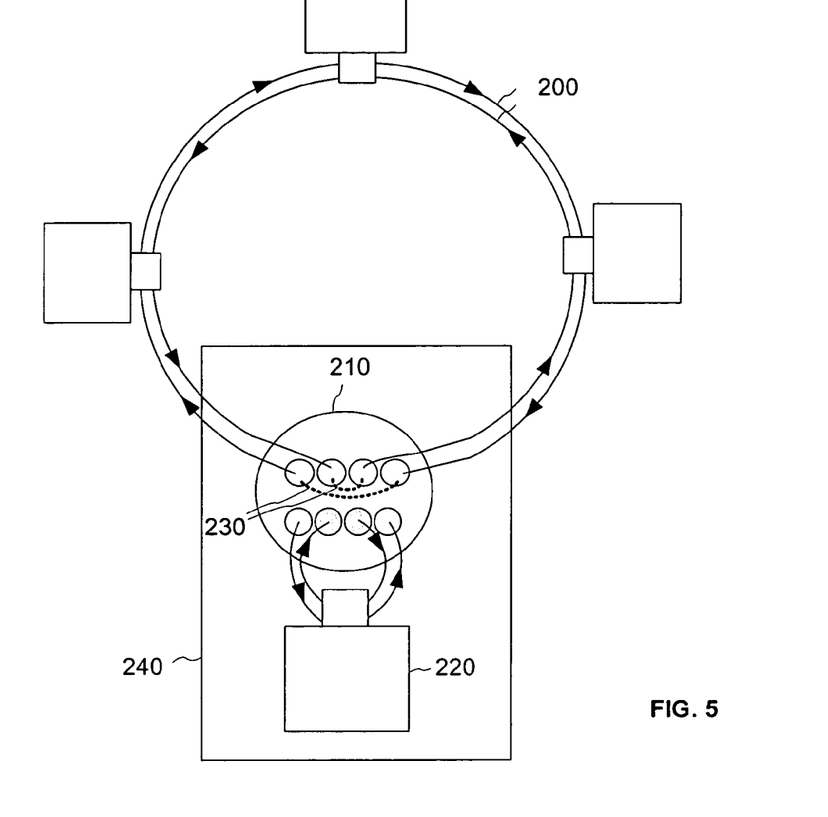
FIG. 5 is a schematic block diagram illustrating switching of a bi-directional optical traffic flow by the dual 2×2 bypass switch according to the present invention.
Figure 5A:
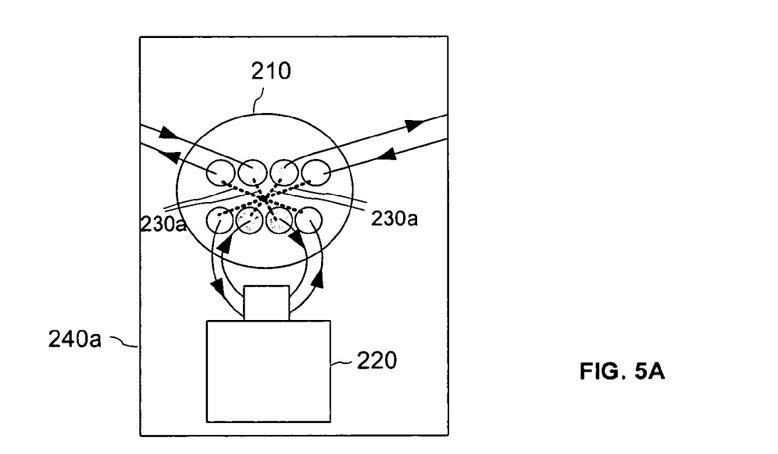

FIG. 5 illustrates how the dual bypass 2×2 switching device 210 can be used in a bidirectional optical network 200 to include or bypass a node 220. Dotted lines 230 show connections within the switching device 210, which is in the second, bypass or loopback, mode of operation. FIG. 5A illustrates the first, cross-state, mode of operation, wherein the node 220 is included in the network. Block 240a shows the same part of the network as block 240, but with the switch 210 in the first mode of operation. Dotted lines 230a show connections within the switch 210.

The aforedescribed optical switching device can also have other modes of operation; e.g. it can function as a dual 1×2 switch or as a combination of a 1×2 and 2×2 bypass switches ganged together. By way of example, in a third mode of operation of the aforedescribed optical switching device shown in FIGS. 2A,B the ports 102a and 102e are inactive, and a first optical signal received from a first port 102b of the first group of ports is directed to a second port 102c of the first group of ports, and a second optical signal received from a first port 102f of the second group of ports is directed to a second port 102g of the second group of ports, with the movable refractor 110 out of the paths of the first and second optical signals. Inserting the movable refractor 110 in the path of the beams between the lens 104 and the reflector 106 switches the switching device into a fourth mode of operation, wherein the beams received by the switching device via ports 102b and 102f are re-directed to the third port 102d of the first group of ports and the third port 102h of the second group of ports, respectively.

The switching between the third and the fourth modes thus makes the device effectively a dual 1×2 switch, wherein within a first 1×2 switch of the dual 1×2 switch, the beam of light received at the port 102b is directed to the port 102c while the device is in the third mode of operation, and redirected to the port 102d following switching to the fourth mode of operation, and within a second 1×2 switch of the dual 1×2 switch, the beam of light received at the port 102f is directed to the port 102g while the device is in the third mode of operation, and redirected to the port 102h following switching to the fourth mode of operation.

Advantageously, the instant invention provides a switching device, wherein synchronous switching within two or more groups of ports is achieved by sharing the same optical components for redirecting light within each group of ports: the lens 104, the reflector 106, the refractor 110 and the actuator 112. This sharing results in the device which is almost as simple as a single switch, but provides functionality of two or more optically isolated switches sharing common switching means for synchronous switching, thereby enabling substantial size and cost reduction comparing to the prior art solutions. Also advantageously, the optical switching device provided by the current invention is single-sided, so that all the fiber ports disposed at the same side thereof, making the switch more compact than conventional double-sided switches.

Other embodiments and modes of operation can be readily adapted without departing from the scope of the invention. For example, a third group of ports optically mutually decoupled from each of the first and second groups of ports can be added for providing triple switch functionality, and/or additional movable refractors can be incorporated for switching light in other port combinations.

What is claimed is:

1. An optical switching device comprising:
   a plurality of ports comprising:
      a first group of ports for transmitting and receiving a first optical signal and a second group of ports for transmitting and receiving a second optical signal;
   a stationary reflector for receiving the first optical signal from a first port of the first group of ports and the second optical signal from a first port of the second group of ports, and for substantially reflecting the first and second optical signals towards the plurality of ports;
   a lens disposed between the plurality of ports and the stationary reflector for substantially collimating the first and second optical signals at the stationary reflector, and for substantially focusing the first optical signal about the first group of ports, and the second optical signal about the second group of ports; and
   a movable refractor selectably positionable at two positions in and out of optical paths of the first and second optical signals between the plurality of ports and the stationary reflector,
      for directing the first optical signal to a second port of the first group of ports and the second optical signal to a second port of the second group of ports when the movable refractor is in a first of the two positions, and
      for redirecting the first optical signal to a third port of the first group of ports, and the second optical signal to a third port of the second group of ports by re-positioning the movable refractor into a second of the two positions;
   wherein the first group of ports is positioned between ports of the second group of ports, and the first group of ports and the second group of ports are mutually optically decoupled, so that to be substantially optically isolated when the movable refractor is in any one of the two positions, thereby providing dual switch functionality.

2. The optical switching device of claim 1, wherein each of the first group of ports and the second group of ports comprises at least 3 ports, for forming a dual 1×2 switch.

3. The optical switching device of claim 1, wherein each of the first group of ports and the second group of ports comprises at least 4 ports, for forming a dual 2×2 switch.

4. The optical switching device of claim 1 further comprising a third group of ports optically mutually decoupled from each of the first and second groups of ports for providing triple switch functionality.

5. The optical switching device described in claim 1, further comprising a spacer positionable between the plurality of ports and the lens for reducing insertion loss of the switching device.

6. The optical switching device as defined in claim 1, wherein the moveable refractor is positionable between the lens and the stationary reflector.

7. The optical switching device as defined in claim 1, wherein the moveable refractor has an index of refraction which differs from an adjacent surrounding medium.

8. The optical switching device as defined in claim 1, further comprising an actuator for selectably repositioning the moveable refractor from the first to the second of the two positions.

9. The optical switching device described in claim 1, comprising a plurality of moveable refractors disposed between the plurality of ports and the stationary reflector.

10. The optical switching device as defined in claim 1, wherein the moveable refractor is a substantially light transmissive wedge.

11. The optical switching device as defined in claim 1, wherein the moveable refractor is a prism.

12. The optical switching device as defined in claim 1, wherein the stationary reflector is a substantially reflective mirror.

13. The optical switching device as defined in claim 1, wherein the lens is a GRIN lens.

14. The optical switching device as defined in claim 1, wherein each of the plurality of ports is provided by an optical fibre end.

15. The optical switching device as defined in claim 14, wherein the optical fibre is multimode.

16. An optical switching device comprising:
a first switch having at least three ports for receiving and transmitting a first optical signal, and a second switch having at least three ports for receiving and transmitting a second optical signal, wherein the ports of the first switch are disposed between the ports of the second switch, and wherein the first and the second switches share common switching means for synchronous switching the first and second switches between a first mode of operation and a second mode of operation, the common switching means comprising:
a stationary reflector for receiving the first and second optical signals from the ports of the first and second switches respectively, and for substantially reflecting the first and second optical signals towards the ports of the first and second switches respectively;
a lens disposed between the ports of the first and second switches at one side thereof, and the stationary reflector at another side thereof, for substantially collimating the first and second optical signals at the stationary reflector, and for substantially focusing the first and second optical signals about the ports of the first and second switches respectively; and
a movable refractor positionable in and out of optical paths of the first and second optical signals between the stationary reflector and the ports of the first and second switches for providing the first and second modes of operation;
wherein in the first mode of operation a first port of the first switch is optically coupled to a second port of the first switch, and a first port of the second switch is optically coupled to a second port of the second switch, and wherein in the second mode of operation the first port of the first switch is optically coupled to a third port of the first switch, and the first port of the second switch is optically coupled to a third port of the second switch.

17. The optical switching device as defined in claim 16, wherein the lens is a GRIN lens.

18. The optical switching device as defined in claim 16, wherein each of the ports of the first and second optical switches is provided by an end of an optical fibre.

* * * * *